United States Patent [19]

Pohl

[11] Patent Number: 4,591,913
[45] Date of Patent: May 27, 1986

[54] METHOD AND CIRCUIT APPARATUS FOR SPECIAL-EFFECT TELEVISION PICTURE TRANSITIONS IN WHICH A PICTURE COMES ON BY GROWING IN SIZE OR FADES AWAY BY DIMINISHING IN SIZE

[75] Inventor: Winfried Pohl, Büttelborn, Fed. Rep. of Germany

[73] Assignee: Robert Bosch GmbH, Stuttgart, Fed. Rep. of Germany

[21] Appl. No.: 611,850

[22] Filed: May 18, 1984

[30] Foreign Application Priority Data

May 21, 1983 [DE] Fed. Rep. of Germany ....... 3318659

[51] Int. Cl.[4] .......................................... H04N 5/262
[52] U.S. Cl. ...................................... 358/183; 358/22
[58] Field of Search .................. 358/183, 22, 182, 187

[56] References Cited

U.S. PATENT DOCUMENTS 4,282,546  8/1981  Reitmeier ........................ 358/183 X
4,527,201  7/1985  Cappels ........................... 358/183 X

FOREIGN PATENT DOCUMENTS 52-22819  2/1977  Japan .................................. 358/183

Primary Examiner—James J. Groody
Assistant Examiner—E. Anne Toth
Attorney, Agent, or Firm—Frishauf, Holtz, Goodman & Woodward

[57] ABSTRACT

Special effect television picture transitions in which the new picture grows from a point on the television screen to occupy the entire screen, displacing the old picture, can be made to originate at any point of the television screen and to bring the picture to occupy precisely the entire television screen under control of a single actuating lever moved to produce the entire transition. The special effect picture size voltages which conventionally control the size of the special effect picture are inverted and multiplied by the corresponding picture shift voltages (horizontal and vertical) to produced inputs to the conventional function generators controlling the position of the special effects picture.

9 Claims, 4 Drawing Figures

METHOD AND CIRCUIT APPARATUS FOR SPECIAL-EFFECT TELEVISION PICTURE TRANSITIONS IN WHICH A PICTURE COMES ON BY GROWING IN SIZE OR FADES AWAY BY DIMINISHING IN SIZE

This invention concerns a method and apparatus for television picture transitions in which instead of one video signal simply fading away while another one becomes visible in terms of picture contrast, one picture moves in to take the place of the other and, more particularly, the picture moving in increases in size or the other one decreases in size.

One of the tasks of a television picture mixing apparatus consists of transitions between pictures and/or scenes of the special effects type in which the new picture takes over the place on the screen of the previous picture while contained in a geometrical figure of increasing size. The control signals for such transitions are obtained from a special effects generator, sometimes referred to as a trick generator.

As shown for example in U.S. Pat. No. 4,287,534 assigned to the same assignee, the desired figure form for a special effects transition is derived from a combination of function signals respectively of horizontal scanning frequency and vertical scanning frequency. The function signals are produced in function generators which are synchronized by the horizontal and vertical synchronizing pulses of a television transmission system. In order to obtain control signals, the outputs of the function generators are passed through limiters. By variation of the limiter characteristics by means of a picture-transition voltage (which may be referred to as a fading voltage by analogy to the video amplitude fading practice) the size of the special effects geometrical figure outlined can be controlled at any moment. For position shift of the special effects figure, a continuously variable DC voltage is provided.

In the case of these known special effects generators, shifting of the special effects figure out of the middle of the picture screen is out of the questions that from the opposite picture edge a second figure will come up and the shifted figure will be limited in some way or other during the transition. When a special effects figure, not shifted out of the middle, is used for a transition, the transition is formed in such a way that at the end of the transition the edge of the special effects figure enclosing the new picture will vanish beyond the picture screen rim.

When the special effects figure is shifted out of the middle, the spacing from the midpoint of this figure to at least one of the picture screen edges is greater than what can be covered within the transition picture growth range. This disadvantage could be overcome by making the transition growth range greater, but this would lead to the disadvantage that the lever or similar control used for the conduct of the transition would be active only over half of its transition range capability, so that for the most commonly used applications, its adjustment would become considerably more critical.

It is an object of the present invention to overcome the disadvantages of the special effect transitions heretofore made available and to provide a simple special effect transition whereby a special effect picture can grow in size and move to the middle of an offset location in a manner controllable by a single transition-process control.

Briefly, the special effects function generators have their picture centering input switchable either for direct control of special effect picture centering, by settable voltages for horizontal and vertical position, or else by a voltage that varies simultaneously with a special effects picture size voltage in such a way that the center position and full picture size are reached simultaneously. For this purpose the picture size control voltage, sometimes known as the fading voltage, which increases with the special effects picture size, is inverted and multiplied by the offset voltage and applied through a suitable switch to the function generators for use when the special effect transition is desired. When the special effect picture has its smallest size, it has its predetermined maximum offset and when it has its greatest size it is centered and fills a full picture screen. By virtue of the inversion and multiplying, a single set of control voltages are supplied indicated in an inverted and multiplied form to the function generators and directly to the vertical and horizontal comparators which control the special effects picture size by operating on the outputs of a picture combining circuit.

The invention has the advantage that with only a small amount of additional circuitry, a special effect transition can be made from any position on the screen by the actuation of only a single transition control lever or the like. In one of the most important special effect picture configurations, namely the rectangle, it is made possible, for any desirable rectangular format, for the rectangular edge of the special effect picture to remain entirely in the picture reproduction region (i.e., within the limits of the screen), except of course in the final position of the control when the special effects picture edge has reached the limits of the screen.

BRIEF DESCRIPTION OF THE DRAWINGS

The invention is further described by way of illustrative example with reference to the annexed drawings, in which.

DESCRIPTION OF THE ILLUSTRATED METHOD AND EMBODIMENT

1. FIGS. 1a and 1b respectively illustrate the final and initial conditions of a rectangular picture transition.

Figure 1:
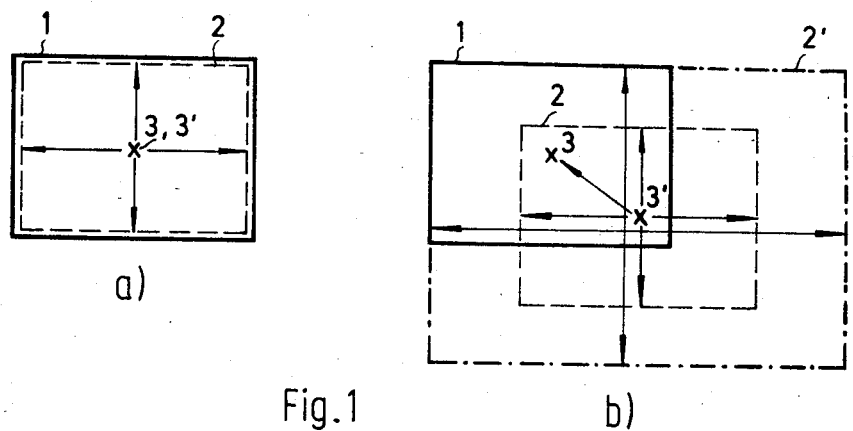
FIG. 1a and FIG. 1b respectively represent two representations of a picture screen at different stages of a rectangular picture transition.

FIG. 1 is intended to show a picture screen which has a rectangular contour 1 that registers exactly with the contour 2 of the picture which is to be brought into view by a special effect transition. The boundary 2 is shown inside the boundary 1 in the drawing merely to make both of them visible while showing close agreement.

In this case the picture transition range and the picture transition requirement are of the same size. The mid-points 3 and 3' respectively; of the picture screen and of the picture to be brought in by special effect coincide.

FIG. 1b shows a picture screen having a contour 1 that does not coincide with the contour 2 of the picture to be brought in by special effect, the latter having a mid-point 3' offset to the right and downwards from the midpoint 3 of the picture screen. The area framed by the rectangular contour 2 shows the transition region obtainable by moving the special effect transition lever through its full course. The previous picture in this case is not fully displaceable by a new picture by the expansion special effect. The necessary range, or special effect transition range requirement for a complete transition to the new picture is illustrated by the area enclosed by the dot-dash frame 2'. In this case, however, only a part of the new picture would then be visible on the picture screen. This disadvantage is avoidable if, simultaneously with the picture transition special effect, a shift of the rectangle mid-point 3' would be made toward the picture screen mid-point 3. Since with both shift of the picture and increase in size of the special effect configuration on the picture screen there are edges of illustrated objects that are displaced on the screen, there is nothing particularly noticeable when an enlargement and the shift towards the center take place at the same time. A simultaneous manipulation of a special effect transition lever and of a picture shift lever for carrying out this combined operation is not necessary in this case if, in accordance with the invention, the shift voltage is reduced by multiplication by picture transition voltage. The method must be carried out separately for the horizontal and vertical directions in order to make possible correct transitions between rectangles of different formats.

Figure 2:
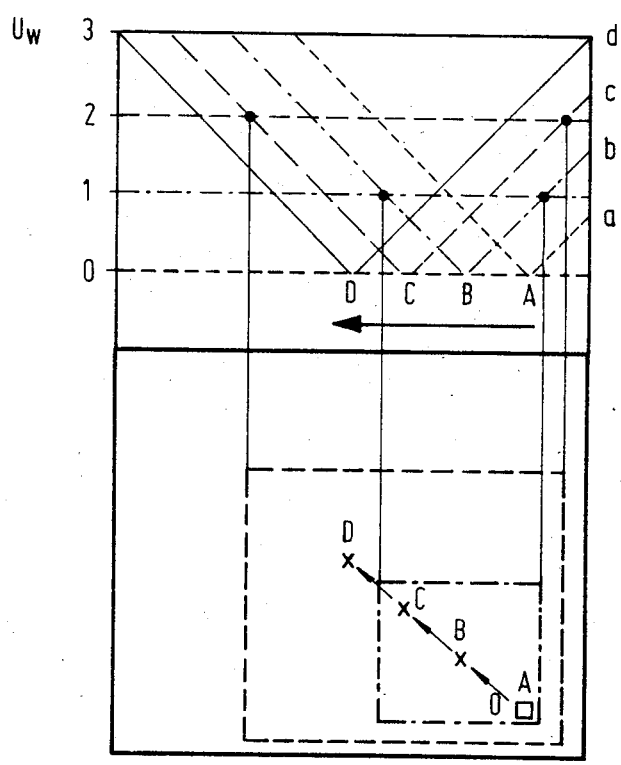
FIG. 2 is a diagram for explanation of the picture transition operation.

FIG. 2 illustrates the manner of operation of the method of the invention by reference to a special effect transition of a rectangular picture introduced at a point to the right and down from the picture screen center. In the upper part of the figure shows the mid-point shifts by shift voltage reduction, from initial point A at the right through three intermediate stages passing over the values B and C to the final point, D showing how the shift voltage changes simultaneously with the shift of the picture-transition voltage $U_W$ from the value zero through the values 1 and 2 to the final value 3. By reference to the corresponding signal courses A,B,C and D, each for one line extent, it is easily recognizable in what width the video signal of the new picture will be reproduced during the special effect transition. In the lower part of FIG. 2 are shown the corresponding resulting rectangular configurations which are provided when there is a similar displacement in the vertical direction also.

Figure 3:
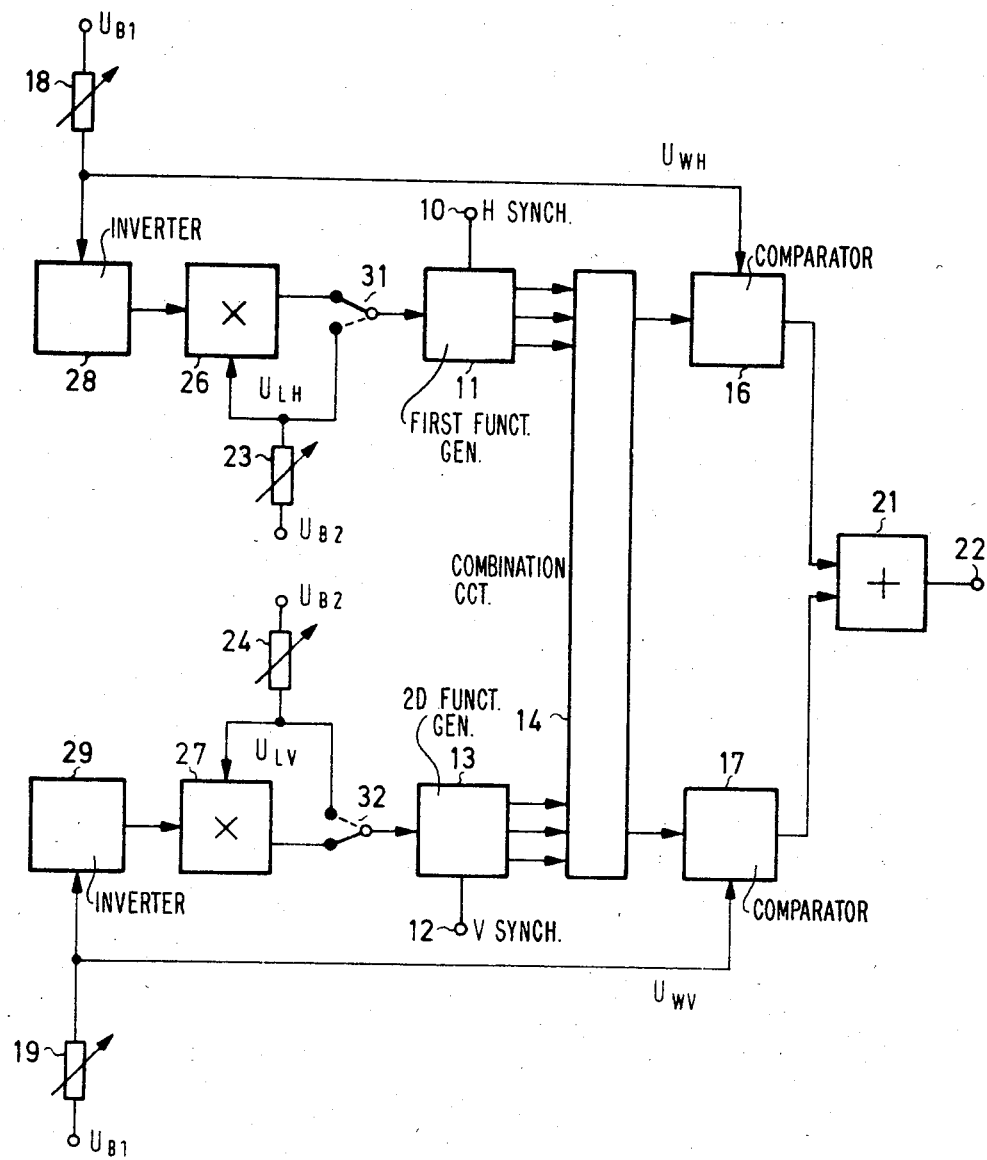
FIG. 3 is a circuit block diagram of apparatus for carrying out the method of the invention.

The block circuit diagram shown in FIG. 3 contains only the portions of a special effect generator which are necessary for explanation of the invention. The special effect generator has a first function generator 11 synchronized with horizontal synchronizing pulses provided at the terminal 10 and likewise a second function generator 13 synchronized by vertical synchronizing pulses provided over the terminal 12. Different kinds of function signals, as for example sawtooth, parabolic or triangular signals are produced in the generators 11 and 13 so that they can be combined in the combination circuit 14 for producing different kinds of special effect configurations. Rectangular configurations are an exception to this combination possibility and simply require that sides at right angles to each other in such a configuration be separately adjustable for the horizontal and vertical direction.

At the output of the combination circuit 14 there are connected comparators 16 and 17 respectively for the horizontal and the vertical directions. The comparator circuits 16 and 17 serving respectively for the horizontal and vertical direction. The comparator circuits 16 and 17 are supplied as their respective second signal magnitudes the d.c. voltages $U_{WH}$ and $U_{WV}$ respectively taken off from the adjustable resistances 18 and 19. The latter resistances are supplied with current from the voltage source $U_{B1}$ and are adjustable by means of the picture transition lever. The picture transition voltages $U_{WH}$ and $U_{WV}$ in a known manner produce a size change respectively in the horizontal and in the vertical directions of the special effect configuration. For example, in rectangular special effects the horizontal sides are variable by the voltage $U_{WH}$ and the vertical sides by the voltage $U_{WV}$.

The outputs of the comparator circuits 16 and 17 are connected to respective inputs of an addition stage 21, at the output 22 of which a video signal of a correspondingly adjusted special effect configuration is made available.

For positions shift of the special effect configuration a shift lever is provided by which additional variable resistances 23 and 24 can be set for the horizontal and vertical positions respectively. The resistances 23 and 24 are supplied with current from a voltage source $U_{B2}$ and they make available, respectively, d.c. voltages $U_{LH}$ and $U_{LV}$. These voltages are then supplied respectively to the function generators 11 and 13 for position shift of the special effect configuration.

For carrying out the method of the invention multiplier stages 26 and 27 are provided having first inputs respectively connected to the shift voltages $U_{LH}$ and $U_{LV}$ and to the inverter stages 28 and 29 which respectively invert the picture transition voltages $U_{WH}$ and $U_{WV}$. The inverter stages 28 and 29 each consist of an inverting operational amplifier with d.c. offset or shift. The picture transition voltages $U_H$ and $U_V$ are respectively converted into control voltages in such a way that simultaneously with a special effect configuration enlargement resulting from the application of the picture transition voltages to the comparator circuits 16 and 17, a reduction of the shift voltages $U_H$ and $U_W$ and hence of the special effect configuration offset from the picture screen center takes place. The d.c. voltage shift assures that the reduction of the shift voltage takes place within a defined range. If a special effect configuration of particular size is to be displaced, the multiplier stages 26 and 27 operate as fine adjustment amplifiers so that the special effect size does not change during displacement. The shift range is thereby dependent upon the special effect magnitude.

In order to preserve the possibility for special applications of bringing in a special effect configuration without complete replacement of the old picture by the new one, switches 31 and 32 are provided which in the position represented by broken lines the shift voltages $U_{LH}$ and $U_{LV}$ are directly applied to the function generator 11 and 13 respectively.

Although the type of picture transition that has been described introduces a new picture beginning with a very small size at any particular point on the picture screen and then growing so as to occupy the entire screen, it is evident that the same operation can be carried out in reverse if it should be desired to have a picture previously shown gradually vanish towards any particular point of the picture screen as it reveals the new picture. Thus, the vanishing point can be chosen to be an unimportant or uncluttered part of the new picture.

It will be seen that although the invention has been described with reference to a particular illustrative example, variations and modifications are possible within the inventive concept.

The disclosure of U.S. Pat. No. 4,287,534, mentioned in the introduction of the specification is hereby incorporated by reference to show the preferred constitution of the function generators 11 and 13, the combining circuit 14, the comparators 16 and 17.

I claim:

1. Method of special-effect television introduction of a new picture while a previous picture is still showing in which one picture changes in size showing only the remainder of the other one, in response to a monotonically changing picture-transition voltage, comprising the steps of:

beginning a transition with the new picture having its smallest size at a location offset from the center of the picture screen;

enlarging the new picture in proportion to a progressively increasing picture-transition voltage;

inverting said picture transition voltage so that the inverted voltage decreases while said picture transition voltage increases and multiplying said inverted voltage by a factor determined by said offset of said location of the picture screen, and applying the voltage obtained by multiplying said inverted picture-transition voltage to reduce the offset progressively at the same time that said new picture is enlarged so that, and until, the new picture is centered when it reaches full screen size.

2. Method according to claim 1, in which said voltage obtained by multiplying said inverted picture-transition voltage is added to a DC bias voltage which defines the offset of said location at which said new picture has its smallest size at the beginning of the transition.

3. Method according to claim 1, in which the new picture is in rectangular format and in which the multiplication of said picture-transition voltage is carried out separately for the horizontal and vertical components of offset.

4. Method according to claim 2, in which the new picture is in rectangular format and in which the multiplication of said picture-transition voltage is carried out separately for the horizontal and vertical components of offset.

5. Method of special effect television introduction of a new picture while a previous picture is still showing in which one picture changes in size showing only the remainder of the other one in response to a monotonically changing picture transition voltage, comprising the steps of:

determining a vanishing point for the previous picture, which is offset from the center of the viewing screen;

diminishing the size of the previous picture in proportion to a progressively decreasing picture-transition voltage while the new picture fills in the remainder of the screen;

inverting said picture-transition voltage so that the inverted voltage decreases while said picture-transition voltage increases and multiplying said inverted voltage by a factor determined by said offset of said vanishing point from the picture screen center, and applying the voltage obtained by multiplying said inverted picture-transition voltage to produce a progressively increasing offset of said previous picture at the same time that said previous picture is diminished in size until the previous picture reaches its final smallest dimension at said desired offset:

6. A method according to claim 5, in which said voltage obtained by multiplying said inverted picture-transition voltage is added to a DC bias voltage which defines the offset of said vanishing point.

7. Method according to claim 5, in which the previous picture maintains its rectangular format during the transition and in which the multiplication of said picture-transition voltage is carried out separately for the horizontal and vertical components of offset.

8. Method according to claim 6, in which the previous picture maintains its rectangular format during the transition and in which the multiplication of said picture-transition voltage is carried out separately for the horizontal and vertical components of offset.

9. Apparatus for special-effect television introduction of a new picture while a previous picture is still showing, in which one picture changes in size to show only the remainder of the other one, in response to a gradually monotonically changing picture-transition voltage, while at the same time moving between an off-center location and the center of the television screen, comprising;

a first function generator (11) of the horizontal scanning frequency and a second function generator (13) of vertical scanning frequency for control of special effect contour and midposition;

a picture combination circuit (14) for combining a picture being viewed with a special effect picture, having inputs connected to the outputs of said respective function generators;

a horizontal dimension comparator circuit (16) having a first input connected to a first output of said picture combination circuit and a second input connected to a first DC voltage for horizontal picture size control of said special effect picture;

a vertical dimension comparator circuit having a first input connected to a second output of said picture combination circuit and a second input connected to a second DC voltage for vertical picture size control of said special effect picture;

means for manually controlling, in coordination, said first and second variable DC voltages;

first inverter means (28) for inverting said first variable DC voltage so that its output voltage decreases when said first DC voltage increases;

second inverter (29) for inverting said second variable DC voltage so that its output voltage decreases when said second DC voltage decreases;

first multiplier means (26) for multiplying the output of said first inverter (28) and having a multiplier factor input connected to a third variable DC voltage;

second multiplier means (27) for multiplying the output of said second inverter (29) and having a multiplier input connected to a fourth variable DC voltage, said third and fourth variable DC voltages being connectible respectively to said first and second function generators (11, 12) and of a magnitude such that when so connected, they control through said respective function generators the position of the center of said special effect picture;

coordinated switch means (31, 32) for alternately connecting inputs of said respective function generators (11,13) either indirectly to the outputs of said respective multipliers or directly to said third and fourth DC voltages;

means for adjusting said third and fourth variable DC voltages, and means (21) for additively combining the respective outputs of said first and second comparator circuits (16,17) to provide a television signal output.

* * * * *